(12) United States Patent
McBride

(10) Patent No.: US 8,253,570 B1
(45) Date of Patent: Aug. 28, 2012

(54) RFID-BASED PERSON LOCATION DEVICE

(76) Inventor: William B. McBride, Tallahassee, FL (US)

( * ) Notice: Subject to any disclaimer, the term of this patent is extended or adjusted under 35 U.S.C. 154(b) by 1182 days.

(21) Appl. No.: 12/080,431

(22) Filed: Apr. 1, 2008

(51) Int. Cl.
   *G08B 13/14* (2006.01)
(52) U.S. Cl. ............... 340/572.4; 340/572.1; 340/572.8
(58) Field of Classification Search ............... 340/572.1, 340/572.4, 572.7, 572.8, 539.11, 539.13, 340/539.23, 10.1, 10.41, 10.51; 235/385, 235/400; 342/70–72, 159, 435, 472.01
   See application file for complete search history.

(56) References Cited

U.S. PATENT DOCUMENTS

| | | | | |
|---|---|---|---|---|
| 5,486,830 | A * | 1/1996 | Axline et al. | 342/43 |
| 7,121,464 | B2 * | 10/2006 | White | 235/400 |
| 7,373,105 | B2 * | 5/2008 | Dybdal et al. | 455/13.4 |
| 7,453,363 | B2 * | 11/2008 | Reynolds | 340/572.7 |
| 2007/0023520 | A1 * | 2/2007 | Miyashita | 235/451 |
| 2010/0289691 | A1 * | 11/2010 | Ivtsenkov et al. | 342/45 |

* cited by examiner

*Primary Examiner* — Van T. Trieu
(74) *Attorney, Agent, or Firm* — Peter Loffler

(57) ABSTRACT

A device that allows soldiers to find lost or captured comrades uses standard RFID technology wherein the missing soldier has an RFID tag on his person. The searcher uses a reader that uses a directional antenna in order to increase system range. The reader also has a digital compass thereon so that once the reader determines the direction to the missing soldier, the compass outputs the direction. An RFID radar on the reader determines the distance between the reader and the tag. A GPS chip on the reader gives the GPS coordinates of the reader while appropriate circuitry calculates the GPS coordinates for the tag based on the GPS coordinates for the reader, and the direction and distance to the tag. The reader and the tag communicate using spread spectrum technology in order to prevent system corruption.

14 Claims, 2 Drawing Sheets

RFID-BASED PERSON LOCATION DEVICE

BACKGROUND OF THE INVENTION

1. Field of the Invention

The present invention relates to a system that relies on radio frequency identification tags (RFID) working with an RFID radar, a directional antenna, a digital compass and a GPS system, in order to locate a lost person, such as a soldier missing in a combat zone.

2. Background of the Prior Art

Radio Frequency Identification (RFID) systems are in common use in a variety of setting such as supply chain management. Shoppers often see the little RFID tags on retail items being purchased. The RFID tags commonly measure in the neighborhood of about 1¼ inches by about ¼ inch and are about ¹⁄₁₆ of an inch thick. The RFID tag contains a receiving antenna, a transmitting antenna, and an integrated circuit chip between the antennas for controlling the device. When a reader is passed over the chip, the reader sends a signal which is received by the receiving antenna, thereby activating the chip. The chip then sends a coded message back to the reader via the transmitting antenna. The circuit chip of the RFID tag uses energy received from the receiving antenna to power the circuit chip as well as the transmitting antenna. This application is referred to as "Passive RFID". The range (the effective distance between reader and the RFID chip) is limited to only a few feet. If more distance is desired between the reader and the chip (such as in a warehouse, for example), a battery is added on board the RFID tag in order to increase the power of the device. In this active RFID system, the battery is inactive until a signal is received from the reader by the receiving antenna such that the power from the incoming signal turns the battery on to power the outgoing signal. This way, the battery, which is typically smaller than a normal hearing aid battery, is only on for a very short period and its shelf life is approximately 10 years or so. The use of a battery, coupled with a high gain antenna on the reader, can extend the effective range between the reader and the RFID tag to about 500 yards. Active RFID tags also tend to have fewer communication errors between the tag and the reader. A third type of RFID tag is known as a semi-passive system that has an onboard battery, but the battery only provides power to the circuit chip and not to the transmitting antenna. Semi-passive tags are often used in areas where RFID tag measurements are of prime importance such as measurement of the temperature of perishable foods.

Radio transmissions travel at a known speed, namely the speed of light. Radio signals can be bounced off of an object and returned to the transmission point. By measuring the time it takes between the time the signal is dispatched and the time the signal is returned, and knowing the speed of light, the distance between the antenna and the object can be calculated. That's how RADAR works. Therefore, by measuring the time elapsed from the transmission of the signal from the reader to the RFID chip and back to the reader the distance separating the reader and the RFID tag can be precisely calculated.

Antennas that are presently used for RFID systems are normally omni-directional. This means that the antennas project and receive signals from all directions simultaneously, much like automobile radio antennas. Another type of antenna is the unidirectional antenna. An example is the TV dish antenna pointed at a particular satellite. It has a parabolic shape with the antenna set at its focal point. Because it must be pointed at the other antenna with which the unidirectional antenna desires to communicate, this first antenna indicates the direction of the other antenna. It's not necessary that the other antenna also have this shape. Another type of directional antenna is known as the Yagi-Uda or more simply the Yagi antenna, which uses an array of a dipole and a series of parasitic elements, which are typically a reflector and one or more directors. The dipole in the Yagi array is driven, and another element, which is 5% longer than the dipole, operates as a reflector. Other shorter parasitic elements are typically added in front of the dipole as directors. This arrangement gives the Yagi antenna directionality that a single dipole lacks. Yagi antennas are directional along the axis perpendicular to the dipole in the plane of the elements, from the reflector through the driven element and out via the director(s).

The digital compass has become inexpensive and commonplace. For example, many modern vehicles have a digital compass located in the windshield rearview mirror. The digital compass operates by using the "Hall Effect" based on the understanding of the angles at which the earth's magnetic field enters the earth. By using three Hall Effect transistors on the same chip, it can make up for differences induced by tilt up, down or sideways. The digital compass is very accurate in determining which way it's pointed.

Twenty-three satellites circle the earth sending timed signals. These satellites are called Global Positioning Satellites (GPS). A GPS receiver on earth that receives signals from at least three of these satellites can determine its location to within a few feet.

By using an RFID system that utilizes RFID Radar, a directional antenna, a digital compass and an appropriate algorithm, we can determine the location of a missing soldier with an RFID chip in his or her gear by determining the direction and distance from the reader instrument to the his chip. By combining this direction and distance information with the GPS coordinates of the reader, the ability to accurately determine the GPS coordinates, map coordinates and/or latitude/longitude of the missing soldier or other lost person can be achieved.

SUMMARY OF THE INVENTION

The RFID-based person location device of the present invention is used to accurately pinpoint the location of a person who may have been wounded or captured in battle or a person who may simply be lost, such as a lost hiker in the woods. The RFID-based person location device relies on an active RFID tag that is carried by the person, with the RFID reader having RFID radar thereon in order to determine the distance between the reader and the tag. The reader uses a directional antenna such as a Yagi-Uda antenna or a parabolic dish antenna in order to dramatically increase the effective range between the reader and the RFID tag. A digital compass is located on the reader so that once the reader "finds" the RFID tag, the direction to the tag from the reader can be determined. A GPS chip is also located on the reader so that once the reader determines the distance and direction to the RFID tag, a simple algorithm can be employed to determine the exact GPS coordinates for the RFID tag based upon the knowledge of the GPS coordinates for the reader.

The RFID-based person location device of the present invention is comprised of an RFID tag and a reader that is capable of reading a signal generated by the RFID tag The reader has an antenna, which antenna is a unidirectional antenna such as a Yagi antenna. A compass is located on with the reader so that the compass gives a directional output reading based on a direction at which the reader is pointing. A radar is located on with the reader, such that the radar communicates with the RFID tag in order to calculate a distance between the reader and the RFID tag. A GPS chip is located on the reader for providing a first GPS coordinate of the reader and such that a second GPS coordinate of the RFID tag is calculated from the first GPS coordinate and the direction and the distance. A display device, such as an LCD display, is capable of displaying the direction and the distance and/or the GPS coordinates of the RFID tag. The compass may be a Hall effect compass. A boom of the Yagi antenna is capable of collapsing at a pivot point. The display device is located on the reader. The reader may have a pistol grip. The reader and the RFID tag communicate using a spread spectrum frequency transmission protocol.

BRIEF DESCRIPTION OF THE DRAWINGS

Similar reference numerals refer to similar parts throughout the several views of the drawings.

DESCRIPTION OF THE PREFERRED EMBODIMENT

Figure 1:
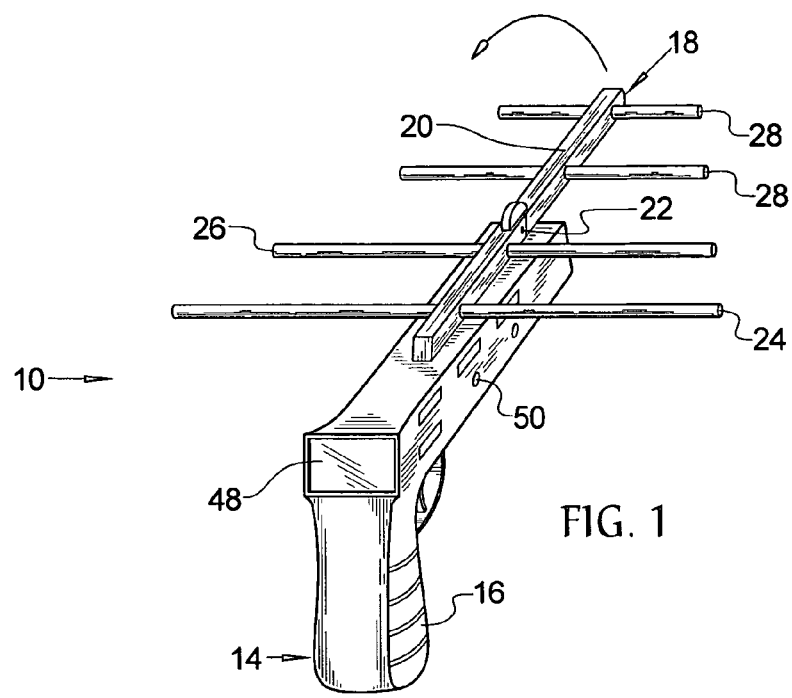
FIG. 1 is a perspective view of a reader used with the RFID-based person location device of the present invention.
Figure 2:
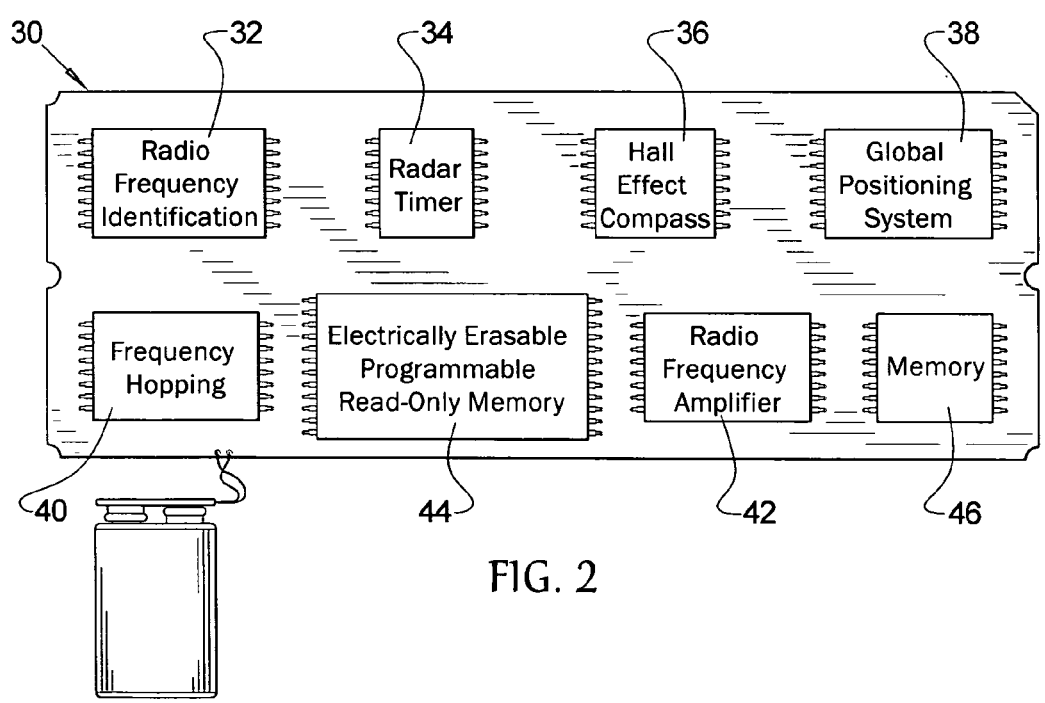
FIG. 2 is an elevation view of the electronic technologies incorporated into the circuitry of the reader RFID-based person location device.
Figure 3:
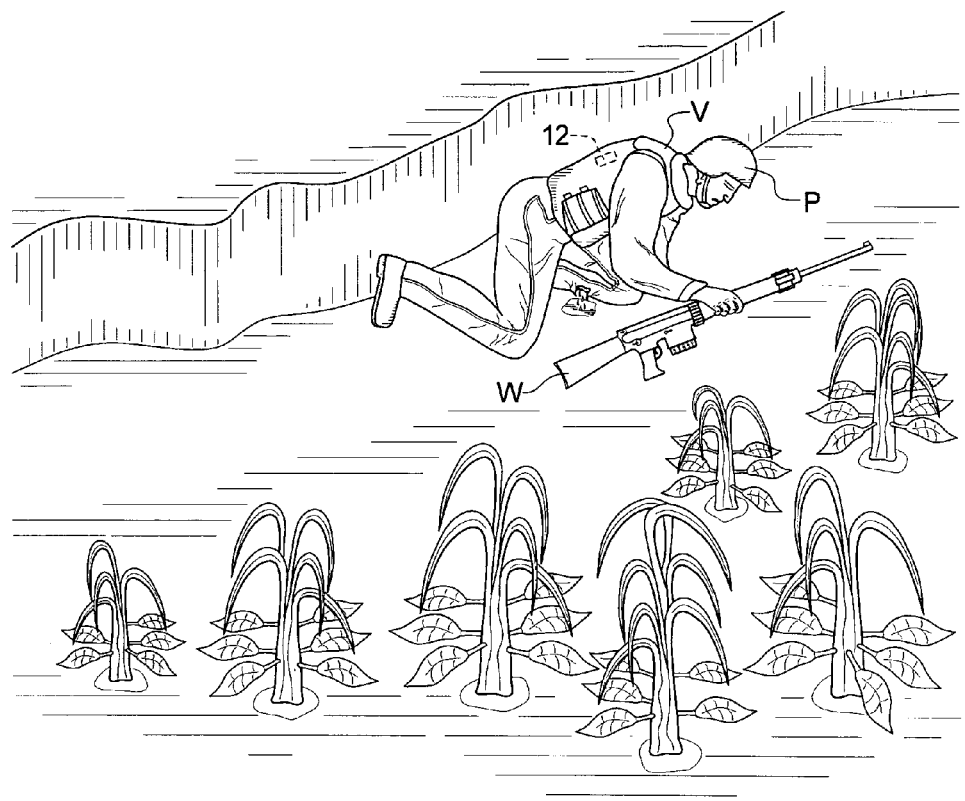
FIG. 3 is a perspective view of the RFID-based person location device being used to locate a wounded soldier.
Figure 3:
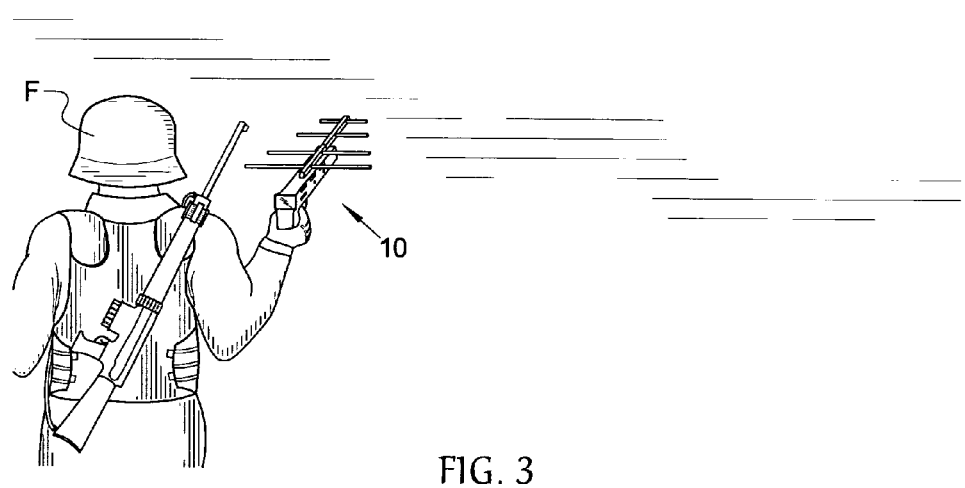

Referring now to the drawings, it is seen that the RFID-based person location device of the present invention, generally denoted by reference numeral 10, is comprised of an RFID (radio frequency identification) tag 12 which is held by a person P whose location it may be necessary to determine, such as the illustrated soldier P. The RFID tag 12 may be placed into the clothing of the person such as being placed into the vest V or other appropriate location, however, it may not prove effective to put the RFID tag 12 into the soldier's weapon W or other object that may be quickly seized should the enemy capture the soldier P. The RFID tag 12 is a typical active RFID tag of appropriate design.

As seen, the RFID reader 14, may have any appropriate shape such as the illustrated, generally pistol shape with a pistol grip 16. Use of a pistol shape helps a soldier F carry the reader 14 using standard military equipment, however, readers having other shapes can also be used. As seen, the reader 14 utilizes a Yagi-Uda or simply Yagi antenna 18 which has a boom 20 that has a pivot point 22 allowing the boom 20 to be collapsed in order to minimize the size of the reader 14 during transport. As seen, the Yagi antenna 18 has the typical architecture including a reflector 24, a driven element 26, and one or more directors 28. Located internally within the reader 14 is appropriate electronic circuitry 30 which includes the typical radio frequency identification chip 32 that is common to RFID readers 14, a radar system 34, a compass 36 that relies on the Hall effect or other appropriate direction determination circuitry, a global positioning system (GPS) chip 38, a frequency hopping module 40, a radio frequency amplifier 42, electrically programmable read-only memory (EPROM) 44 and/or regular memory 46. As seen, an appropriate viewing display device (LCD, etc.,) 48 is located on the reader 14 as is one or more control and input buttons 50.

In order to use the RFID-based lost person locator 10 of the present invention, the person P of concern is fitted with an RFID tag 12 in appropriate fashion. Should the person P become lost, then the person F trying to find the lost person P, utilizes the reader 14, by flipping open the boom 20 of the Yagi antenna 18. The searching person F can rotate in a 360 degree circle until the reader 14 picks up the signal of the RFID tag 12. The radio frequency amplifier 42 helps amplify any signal that is received by the receiver 14. As the reader 14 uses a Yagi antenna 18, the effective range between the reader 14 and the RFID tag 12 is greatly increased relative to a standard RFID system. Once the reader 14 gets an approximate fix on the RFID tag 12, the searching person F can slowly turn back and forth in a small arc in order to more accurately pinpoint the exact direction to the RFID tag 12. The digital compass 36 gives a degree measurement for the direction. Coincidentally (or immediately thereafter), the Radar timer 34 sends out a radar signal to the RFID tag 12 and once the return signal is captured by the reader 14, the distance between the reader 14 and the RFID tag 12 is determined. Additionally, the GPS chip 38 determines the precise GPS coordinates for the reader 14. Once the direction to the RFID tag 12 from the reader 14 is known, via the compass 36, and the distance between the RFID tag 12 and the reader 14 is known, via the radar 34, the GPS coordinates of the RFID tag 12 can be calculated based on the GPS coordinates of the reader 14 as determined by the GPS chip 38. The direction, distance, and GPS coordinates, as well as any other pertinent data (including the GPS coordinates for the reader 14 should the searching soldier need to lob a few mortars against some bad guys that may be between the searching person F and the missing person P), can be displayed on the display device 48 in order to allow the searching person F to be able to quickly come to the rescue of the person being searched for P. The reader 14 may also communicate any desired output with any other appropriate device, such as a laptop computer being used by other soldiers in the hunt for their missing comrade P, a rescue helicopter, or even to an airborne AWCAS helping coordinate search and rescue. Such communication link between the reader 14 and the other devices can be wired, such as by a USB connection, or by appropriate wireless communication path.

As it is anticipated that a reader 14 may eventually fall into the enemy's hands, the system 10 utilizes frequency hopping technology, via the frequency hopping chip 40 so that at the start of each day (or 24 hour period or other determined period), each system 10 is appropriately programmed (either via some form of wireless download, or input via the input controls 50) for the day so that an enemy combatant holding a captured reader 14 will not be able to intercept the signals being generated by the friendlies, unless the combatant has knowledge of the daily spreading characteristics of the system 10 via an appropriate transmission security key.

As mentioned above, the present system 10 can be used in a variety of other settings such as providing the RFID tag 12 in an arm band that can be donned whenever a person, such as a child, enters an national forest, for example. Should the child become separated from his or her parents, the RFID-based person location device 10 can be used to assist in searching for the child. Objects can also be located using the present system.

While the invention has been particularly shown and described with reference to an embodiment thereof, it will be appreciated by those skilled in the art that various changes in form and detail may be made without departing from the spirit and scope of the invention.

I claim:
1. A tracker comprising:
   an RFID tag;
   a reader that is capable of reading a signal generated by the RFID tag, wherein the reader has an antenna, which antenna is a directional antenna;

a compass located on the reader so that the compass gives a directional output reading based on a direction at which the reader is pointing;

a radar located on the reader, such that the radar communicates with the RFID tag in order to calculate a distance between the reader and the RFID tag; and a display device capable of displaying the direction and the distance.

2. The tracker as in claim 1 wherein the compass is a Hall effect compass.

3. The tracker as in claim 1 wherein the antenna is a Yagi antenna.

4. The tracker as in claim 3 wherein a boom of the Yagi antenna is capable of collapsing at a pivot point.

5. The tracker as in claim 1 wherein the display device is located on the reader.

6. The tracker as in claim 1 wherein the reader has a pistol grip.

7. The tracker as in claim 1 further comprising a GPS chip located on the reader for providing a first GPS coordinate of the reader and such that a second GPS coordinate of the RFID tag is calculated from the first GPS coordinate and the direction and the distance.

8. The tracker as in claim 1 wherein the reader and the RFID tag communicate using a spread spectrum frequency transmission protocol.

9. A tracker comprising:

an RFID tag;

a reader that is capable of reading a signal generated by the RFID tag, wherein the reader has an antenna, which antenna is a Yagi antenna;

a compass located on the reader so that the compass gives a directional output reading based on a direction at which the reader is pointing;

a radar located on the reader, such that the radar communicates with the RFID tag in order to calculate a distance between the reader and the RFID tag;

a GPS chip located on the reader for providing a first GPS coordinate of the reader and such that a second GPS coordinate of the RFID tag is calculated from the first GPS coordinate and the direction and the distance; and a display device capable of displaying the direction and the distance and/or the GPS coordinates of the RFID tag.

10. The tracker as in claim 9 wherein the compass is a Hall effect compass.

11. The tracker as in claim 9 wherein a boom of the Yagi antenna is capable of collapsing at a pivot point.

12. The tracker as in claim 9 wherein the display device is located on the reader.

13. The tracker as in claim 9 wherein the reader has a pistol grip.

14. The tracker as in claim 9 wherein the reader and the RFID tag communicate using a spread spectrum frequency transmission protocol.

\* \* \* \* \*